US006562252B1

(12) United States Patent
Ferro

(10) Patent No.: US 6,562,252 B1
(45) Date of Patent: May 13, 2003

(54) METHOD FOR REPRODUCING IMAGES OR TEXT ON A METALIZED HOLOGRAPHIC 2D, 3D BRIGHT COLORED FILM

(75) Inventor: Mario Ferro, Padua (IT)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/469,503

(22) Filed: Dec. 22, 1999

(30) Foreign Application Priority Data

Dec. 23, 1998 (IT) ........................................ MI98A2819

(51) Int. Cl.[7] ................................................ B29D 11/00

(52) U.S. Cl. ............................ 216/24; 216/33; 216/35; 156/244.22; 283/95; 283/96; 283/97; 283/901; 283/902

(58) Field of Search ............................. 216/24, 33, 35; 156/244.22; 283/95, 96, 97, 901, 902; 430/1, 2

(56) References Cited

U.S. PATENT DOCUMENTS

| | | | | | |
|---|---|---|---|---|---|
| 4,634,148 | A | | 1/1987 | Greene | |
| 4,971,646 | A | | 11/1990 | Schell et al. | |
| 5,059,499 | A | * | 10/1991 | Teitel | 430/1 |
| 5,190,318 | A | | 3/1993 | Mantegazza | |
| 5,223,357 | A | * | 6/1993 | Lovison | 430/1 |
| 5,267,753 | A | | 12/1993 | Chock | |
| 5,509,692 | A | | 4/1996 | Oz | |
| 5,521,030 | A | * | 5/1996 | McGrew | 430/1 |
| 5,593,765 | A | * | 1/1997 | Sharpe et al. | 428/225 |
| 5,636,874 | A | | 6/1997 | Singer | |
| 5,810,957 | A | * | 9/1998 | Boswell | 156/220 |
| 5,913,543 | A | * | 6/1999 | Curiel | 283/94 |
| 6,006,415 | A | * | 12/1999 | Schaefer et al. | 29/527.1 |
| 6,221,545 | B1 | * | 4/2001 | Tran et al. | 430/10 |

FOREIGN PATENT DOCUMENTS

| | | |
|---|---|---|
| JP | 04 303881 | 10/1992 |
| WO | WO 97 34170 | 9/1997 |

* cited by examiner

*Primary Examiner*—Randy Gulakowski
*Assistant Examiner*—Gentle E. Winter
(74) *Attorney, Agent, or Firm*—Lowe Hauptman Gilman & Berner, LLP

(57) ABSTRACT

The invention relates to a method for reproducing images or text on a metalized holographic film, comprising a coupling step, in which a bottom metalized holographic film is laminated to a second film, thereon an adhesive mass has been preliminarily deposited, a spreading step in which on the bottom film a copolymeric primer is spread, a printing step in which a suitably activated basic substance is printed, a staged spreading removal step, in which demineralized water and decanting are used in order to remove the crystallized material obtained by the basic substance, a forced air hot bed drying step, a reinforcement processing step, and a printing step in which the text or image is printed in polymeric material colors.

13 Claims, No Drawings

METHOD FOR REPRODUCING IMAGES OR TEXT ON A METALIZED HOLOGRAPHIC 2D, 3D BRIGHT COLORED FILM

BACKGROUND OF THE INVENTION

The present invention relates to a method for reproducing images or text on a metalized holographic film.

A prior unpublished method for reproducing images of texts on a metalized holographic film, that was used in confidence by the assignee of the instant patent application, discloses using an ethyl alcohol solution having a well defined fatty acid thixotropy. The solution was deposited on a substrate so that 28 g/$m^2$ was deposited on the surface.

Thus, an image is provided which must be hot-fixed at a temperature of 45° C. under forced air.

By processing the thus imaged material in a water bath the well defined feature thixotropic base is removed.

The result of the above disclosed process is a pattern on which is printed, at a deposition amount of 28 g/$m^2$, a plurality of colors having vinylchloride-vinylacetate and polyamide 6 bases in a 50:50 ratio with respect to an aromatic solvent mass solution.

A final processing, by using a thermoplastic polyurethane material in an aromatic solution, will allow the reproduced image to be transferred, usually by a hot transferring method.

However, the above disclosed method has a drawback in that, upon removal from the water bath, the pre-printed image will have notched edges.

This bed definition deficiency, directly derived from the above mentioned limitation of the prior art, is caused by the fact that processing with a thixotropic solution, even if it includes a thermosetting operation carried out at 45° C. under forced air, cannot be "locked" and it operates to undesirably cause the above mentioned notched edges of the overall image.

SUMMARY OF THE INVENTION

The aim of the present invention is to provide a method for reproducing images or text on an holographic 2D, 3D film in a manner so as to provide a very good definition of the images or text to be reproduced, where the images or text have a printing size greater than or equal to 1 mm.

Within the scope of the above aim, a main object of the present invention is to provide such a method specifically designed for protecting the printed material as the latter is processed by a set thixotropic characteristic solution.

Yet another object of the present invention is to provide such a method which, by a suitable reinforcing processing, provides the printed product with a great resistance against damage as a result of all the subsequent processing steps.

Yet another object of the present invention is to provide such a method allowing the printed material to be easily coupled to different types of plastic preformed patterns.

The above mentioned aim and objects, as well as yet other objects, which will become more apparent hereinafter, are achieved by a method for reproducing images or text on a metalized holographic film, characterized in that said method comprises the steps of coupling, by laminating, a bottom metalized holographic film to a second film, having an adhesive mass coated thereon, spreading on said bottom film a copolymeric primer, printing an activated basic substance thereon, removing, by stages, by decanting with demineralized water, a formed crystallized material, forcibly drying in a hot bed air system, reinforcing the thus made material, and printing thereon said images or text by using polymeric colors.

DETAILED DESCRIPTION OF THE INVENTION

Further details and advantages as well as important features of the present invention will become more apparent hereinafter from the following detailed exemplary disclosure of a preferred embodiment of the inventive method, which has been given by way of a merely indicative example for illustrating several possible variations of the invention.

More specifically, the inventive method allows the reproduction of images, text, logos, characters, etc. on a starting holographic film. The holographic film may be of various colors. The holographic film may have 2D or 3D patterns. The holographic film may be metallized.

The inventive method moreover allows to easily remove selected portions from the holographic film to obtain a pattern or patterns corresponding to the images, text or the like to be reproduced.

The film is coupled by laminating it to a second film having an adhesive mass thereon that has been already applied by a spreading process.

The thus made sandwich is hot actuated and stabilized in order to allow the adhesive material to evenly adhere between the two supported elements.

28 g/$m^2$ of a vinyl chloride-vinyl acetate copolymer primer is coated on the bottom film.

Then, a basic substance, containing therein 28% of a solution of sodium chloride, is activated by treating with a carboxylic acid and isopropenyl-acetate and by diluting it in 1-4N methylpyrrolidone-methylbutyllactone with a deposition of 11.4 grams/$m^2$, while crystallizing at 40° C. under forced air flow.

A spreading removal system, using demineralized water, and carried out by stages and decantation, will remove the crystallized material.

Then, the film is forcibly dried in a hot bed air system at 45° C.

Then, a reinforcement processing is performed, by depositing 28 g/$m^2$ of a vinyl-chloride-vinyl acetate copolymer followed by thermofixing the copolymer at 45° C.

Then, the text or image is printed in any desired color(s) based on polymeric coloring materials such as vinyl acetate or vinyl chloride with a deposition of 28 grams/$m^2$ and thermofixing at 45° C. in hot air.

Finally, a finishing painting operation is performed, by using a polyester polyurethane thermo-plastic material made up of 86% polyester-polyurethane, 13% vinyl-chloride and 1% vinyl acetate dissolved in a solvent made up of MEK, DMF and isopropylene, thereby allowing transfer of the printed material to any desired plastic preformed support.

For a better understanding of the method according to the present invention it should be pointed out that the use of 28% of a basic substance in a solution of sodium chloride with a carboxylic acid actuation is such as to prevent any damage to the metalized film by later processing, thereby providing a perfectly defined image with a printed size of at least 1 mm.

After the removal step, the reinforcement processing, performed by depositing the above mentioned amount of 28 grams/$m^2$, provides the product with great strength, allowing it to easily resist damage as a result of further possible processing operations.

The final processing, using an aromatic solution, comprising as a solvent: MEK, DMF and isopropylene, of 86% polyester-polyurethane, 13% vinyl chloride and 1% vinyl acetate allows a proper fixing to any desired type of plastic preformed support during the transfer step.

From the above disclosure it should be apparent that the invention fully achieves the intended aim and objects.

What is claimed is:

1. A method of reproducing an image and/or text on a metallized holographic film comprising:

providing a metallized holographic film on a first surface of a first plastic film to form a top film having said metallized holographic film as a first surface;

providing an adhesive layer on a first surface of a second plastic film to form a bottom film having said adhesive on a first surface thereof;

laminating a second surface of said top film to said first surface of said bottom film through said adhesive layer to form a laminate;

printing a copolymeric primer on said first surface of said top film portion of said laminate in the form and shape of said indicia to form a printed laminate having portions of said metallized holographic film exposed between said printed primer;

wherein said primer is substantially resistant to the etching action of an etchant composition;

applying an etchant composition, comprising an activated basic substance, on at least said exposed portions of said metallized holographic film in an amount and under conditions sufficient to etch said exposed metallized holographic film portions and to thereby form crystallized material derived from etching said metallized holographic film portions; and removing said crystallized material from said surface by washing to form a printed, etched holographic structure.

2. A method according to claim 1, further comprising using as said primer a copolymer comprising vinyl chloride-vinyl acetate copolymer and applying said primer for a coverage of about 28 g/m$^2$.

3. A method according to claim 1 further comprising using as said etchant a composition comprising about 28% of a basic substance, a solution of sodium chloride, and an activator comprising a combination of a carboxylic acid and isopropenyl acetate.

4. A method according to claim 1, further comprising drying said primed film by a hotbed air system operating at a temperature of 45° C.

5. A method according to claim 1, further comprising applying as said primer a copolymer of vinyl chloride and vinyl acetate that has been catalytically copolymerized and thermofixed at 45° C.

6. A method according to claim 1, further comprising printing with said vinyl acetate and vinyl chloride copolymer primer deposited in an amount of 28 g/m$^2$ and thermally fixing said copolymer at 45° C. in hot air.

7. A method according to claim 1, further comprising applying a lacquer, comprising 86% of a polyester-polyurethane thermoplastic material, 13% vinyl chloride and 1% vinyl acetate in a solvent comprising MEK, DMF and isopropylene, over said printed, etched, metallized holograph film.

8. A method as claimed in claim 1 further comprising applying as said activated basic substance a composition comprising a solution of sodium chloride combined with a carboxylic acid.

9. A method as claimed in claim 8 wherein said activated basic substance further comprises isopropenyl acetate.

10. A method as claimed in claim 8 wherein said basic substance further comprises methyl pyrrolidone.

11. A method as claimed in claim 10 wherein said basic substance further comprises methyl butyrolactone.

12. A method as claimed in claim 1 wherein said primer comprises a copolymer of vinyl chloride and vinyl acetate.

13. A method as claimed in claim 1 further comprising applying to said printed, etched holographic structure a composition comprising a polyester-polyurethane thermoplastic, vinyl chloride and vinyl acetate, and drying said composition into a lacquer.

* * * * *